(12) United States Patent
Bai et al.

(10) Patent No.: US 12,328,286 B2
(45) Date of Patent: Jun. 10, 2025

(54) INTER-CELL MOBILITY USING BANDWIDTH PART SWITCHING

(71) Applicant: QUALCOMM Incorporated, San Diego, CA (US)

(72) Inventors: Tianyang Bai, Somerville, NJ (US); Yan Zhou, San Diego, CA (US); Peter Gaal, San Diego, CA (US); Tao Luo, San Diego, CA (US); Junyi Li, Fairless Hills, PA (US)

( * ) Notice: Subject to any disclaimer, the term of this patent is extended or adjusted under 35 U.S.C. 154(b) by 357 days.

(21) Appl. No.: 17/656,942

(22) Filed: Mar. 29, 2022

(65) Prior Publication Data

US 2022/0321314 A1    Oct. 6, 2022

Related U.S. Application Data

(60) Provisional application No. 63/169,716, filed on Apr. 1, 2021.

(51) Int. Cl.
| | |
|---|---|
| *H04W 4/00* | (2018.01) |
| *H04L 5/00* | (2006.01) |
| *H04L 27/26* | (2006.01) |
| *H04W 36/00* | (2009.01) |
| *H04W 72/044* | (2023.01) |

(Continued)

(52) U.S. Cl.
CPC ...... *H04L 5/0096* (2013.01); *H04L 27/26025* (2021.01); *H04W 36/0072* (2013.01); *H04W 72/044* (2013.01); *H04W 76/20* (2018.02); *H04W 36/249* (2023.05)

(58) Field of Classification Search
CPC .......... H04L 5/0096; H04L 27/26025; H04W 76/20; H04W 72/044
See application file for complete search history.

(56) References Cited

U.S. PATENT DOCUMENTS

| | | | |
|---|---|---|---|
| 2019/0132109 A1* | 5/2019 | Zhou ....................... | H04L 5/001 |
| 2020/0092869 A1* | 3/2020 | Hwang ................. | H04L 5/0096 |
| 2020/0153500 A1* | 5/2020 | Kim .................. | H04W 56/0065 |

(Continued)

FOREIGN PATENT DOCUMENTS

EP    3866349 A1    8/2021

OTHER PUBLICATIONS

International Search Report and Written Opinion—PCT/US2022/071439—ISA/EPO—Jul. 15, 2022.

(Continued)

*Primary Examiner* — Abdelnabi O Musa

(57) ABSTRACT

Various aspects of the present disclosure generally relate to wireless communication. In some aspects, a user equipment (UE) may receive an indication to switch from a first transmission configuration indicator (TCI) state associated with a first cell to a second TCI state associated with a second cell. The UE may apply the second TCI state, including switching from a first bandwidth part (BWP) associated with the first cell to a second BWP associated with the second cell. For example, the UE may receive an indication to switch from the first BWP to the second BWP. Additionally, or alternatively, the UE may determine to switch from the first BWP to the second BWP based at least in part on the indication to switch from the first TCI state to the second TCI state. Numerous other aspects are described.

30 Claims, 10 Drawing Sheets

(51) Int. Cl.
*H04W 76/20* (2018.01)
*H04W 36/24* (2009.01)

(56) References Cited

U.S. PATENT DOCUMENTS

| | | | | |
|---|---|---|---|---|
| 2020/0229161 | A1* | 7/2020 | Raghavan | H04W 24/10 |
| 2021/0067979 | A1* | 3/2021 | Rahman | H04L 5/0023 |
| 2021/0385832 | A1* | 12/2021 | Zhang | H04B 7/0695 |
| 2022/0029692 | A1* | 1/2022 | Yang | H04W 72/044 |
| 2023/0132040 | A1* | 4/2023 | Gao | H04W 72/23 370/329 |
| 2024/0129959 | A1* | 4/2024 | MolavianJazi | H04L 5/005 |

OTHER PUBLICATIONS

Nokia., et al., "Discussion about RAN1 LS on L1/L2 Mobility", 3GPP TSG-RAN WG2 Meeting #113 Electronic, R2-2103639, 3GPP, Mobile Competence Centre, 650, Route Des Lucioles, F-06921, Sophia-Antipolis Cedex, France, vol. RAN WG2 No. Elbonia, Apr. 12, 2021-Apr. 20, 2021, Apr. 1, 2021, XP051992185, 9 Pages, URL:https://ftp.3gpp.org/tsg_ran/WG2_RL2/TSGR2_113bis-e/Docs/R2-2103639.zip R2-2103639 Discussion about RAN1 Ls on L12-Centric Inter-Cell Mobility.docx.

Nokia., et al., "Enhancements to Enable Inter-Cell Multi-TRP Operations", 3GPP TSG RAN WG1 #103-e, R1-2006845, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020, 8 Pages, XP051915490.

Zte Corporation., et al., "Consideration on L1/L2 Centric Mobility", 3GPP TSG-RAN WG2#114 emeeting, R2-2105857, 3GPP, Mobile Competence Centre, 650, Route Des Lucioles, F-06921, Sophia-Antipolis Cedex, France, vol. RAN WG2 No. Electronic, May 19, 2021-May 27, 2021, May 11, 2021, XP052007330, 8 Pages, URL:https://ftp.3gpp.org/tsg_ran/WG2_RL2/TSGR2_114-e/Docs/R2-2105857.zip R2-2105857 Consideration on the L1L2 centric mobility.docx.

* cited by examiner

INTER-CELL MOBILITY USING BANDWIDTH PART SWITCHING

CROSS-REFERENCE TO RELATED APPLICATION

This Patent Application claims priority to U.S. Provisional Patent Application No. 63/169,716, filed on Apr. 1, 2021, entitled "INTER-CELL MOBILITY USING BANDWIDTH PART SWITCHING," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for performing inter-cell mobility using bandwidth part switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory and one or more processors coupled to the memory. The one or more processors may be configured to receive an indication to switch from a first transmission configuration indicator (TCI) state associated with a first cell to a second TCI state associated with a second cell. The one or more processors may be further configured to apply the second TCI state, including switching from a first bandwidth part (BWP) associated with the first cell to a second BWP associated with the second cell.

Some aspects described herein relate to an apparatus for wireless communication at a network entity. The apparatus may include a memory and one or more processors coupled to the memory. The one or more processors may be configured to transmit an indication of a first TCI state associated with a first cell and a second TCI state associated with a second cell, wherein the first cell is associated with a first BWP and the second cell is associated with a second BWP. The one or more processors may be further configured to transmit an indication to switch from the first TCI state to the second TCI state, wherein the indication is associated with a switch from the first BWP to the second BWP.

Some aspects described herein relate to a method of wireless communication performed by a UE. The method may include receiving an indication to switch from a first TCI state associated with a first cell to a second TCI state associated with a second cell. The method may further include applying the second TCI state, including switching from a first BWP associated with the first cell to a second BWP associated with the second cell.

Some aspects described herein relate to a method of wireless communication performed by a network entity. The method may include transmitting an indication of a first TCI state associated with a first cell and a second TCI state associated with a second cell, wherein the first cell is associated with a first BWP and the second cell is associated with a second BWP. The method may further include transmitting an indication to switch from the first TCI state to the second TCI state, wherein the indication is associated with a switch from the first BWP to the second BWP.

Some aspects described herein relate to a non-transitory computer-readable medium that stores a set of instructions for wireless communication by a UE. The set of instructions, when executed by one or more processors of the UE, may cause the UE to receive an indication to switch from a first TCI state associated with a first cell to a second TCI state associated with a second cell. The set of instructions, when executed by one or more processors of the UE, may further cause the UE to apply the second TCI state, including switching from a first BWP associated with the first cell to a second BWP associated with the second cell.

Some aspects described herein relate to a non-transitory computer-readable medium that stores a set of instructions for wireless communication by a network entity. The set of instructions, when executed by one or more processors of the network entity, may cause the network entity to transmit an indication of a first TCI state associated with a first cell and a second TCI state associated with a second cell, wherein the first cell is associated with a first BWP and the second cell is associated with a second BWP. The set of instructions, when executed by one or more processors of the network entity, may further cause the network entity to transmit an indication to switch from the first TCI state to the second TCI state, wherein the indication is associated with a switch from the first BWP to the second BWP.

Some aspects described herein relate to an apparatus for wireless communication. The apparatus may include means for receiving an indication to switch from a first TCI state associated with a first cell to a second TCI state associated with a second cell. The apparatus may further include means for applying the second TCI state, including means for switching from a first BWP associated with the first cell to a second BWP associated with the second cell.

Some aspects described herein relate to an apparatus for wireless communication. The apparatus may include means for transmitting an indication of a first TCI state associated with a first cell and a second TCI state associated with a second cell, wherein the first cell is associated with a first BWP and the second cell is associated with a second BWP. The apparatus may further include means for transmitting an indication to switch from the first TCI state to the second TCI state, wherein the indication is associated with a switch from the first BWP to the second BWP.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
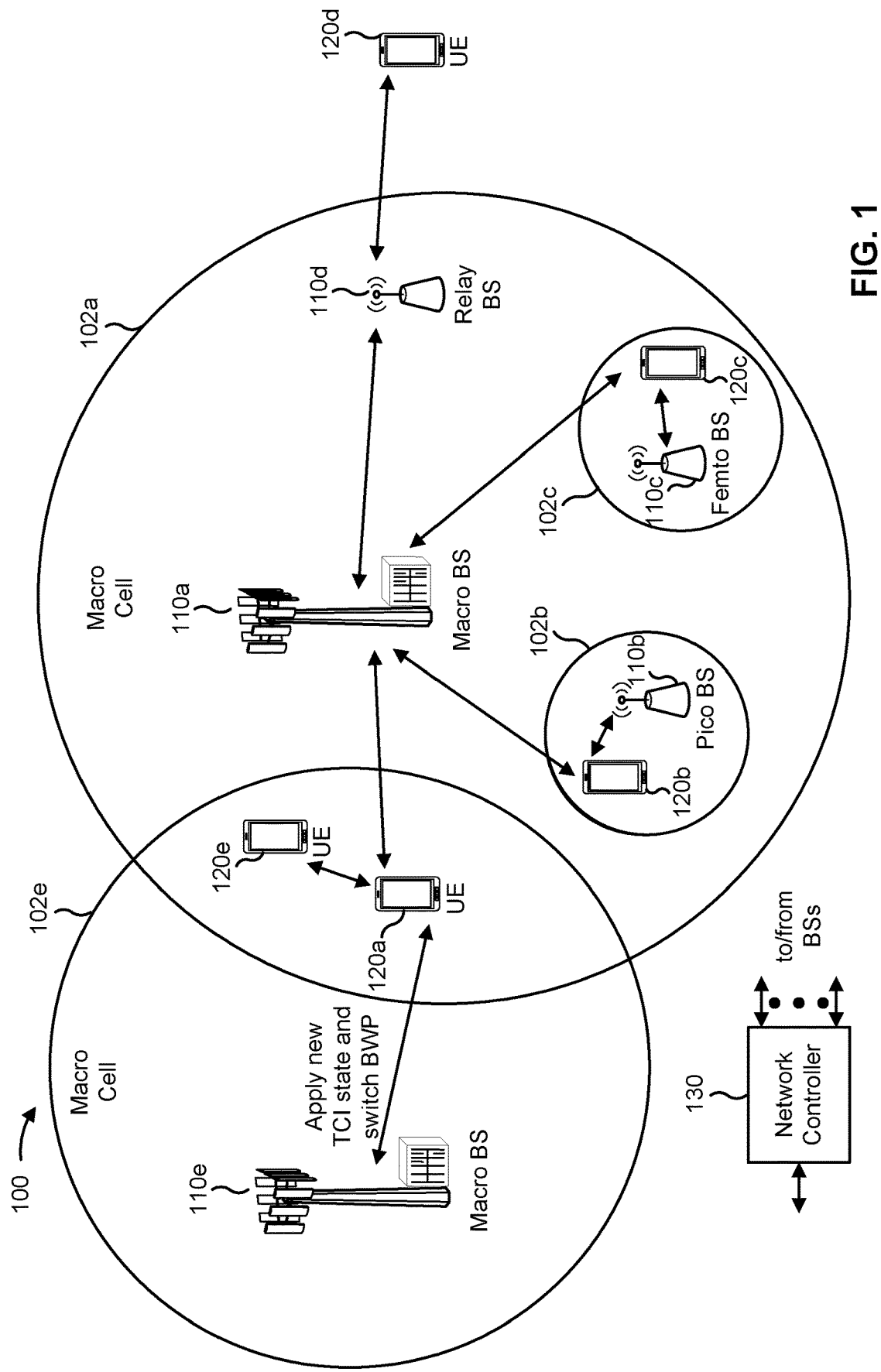
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

In some aspects, a UE (e.g., UE 120a) may communicate with a serving cell (e.g., macro cell 102a) including the BS 110a. As used herein, a "serving cell" may include a primary cell (PCell) with which the UE 120a is in a connected state (e.g., an RRC_CONNECTED state as defined in 3GPP specifications and/or another standard). In some aspects, a "serving cell" may further include a secondary cell (SCell), such as a primary secondary cell (PSCell) or another cell in a secondary cell group (SCG), when the UE 120a is configured for carrier aggregation with the secondary cell and the primary cell.

In some aspects, the BS 110a may activate a transmission configuration indicator (TCI) state associated with a non-serving cell (e.g., macro cell 102e) including the BS 110e. For example, the BS 110a (and/or the BS 110e) and the UE 120a may be configured for beamformed communications, where the BS 110a (and/or the BS 110e) may transmit in the direction of the UE 120a using a directional BS transmit beam, and the UE 120a may receive the transmission using a directional UE receive beam. Each BS transmit beam may have an associated beam ID, beam direction, or beam symbols, among other examples. Additionally, a downlink beam, such as a BS transmit beam or a UE receive beam, may be associated with a TCI state. For example, a TCI state may be indicated using a TCI-State data structure as defined in 3GPP specifications and/or another standard. A TCI state may indicate a directionality or a characteristic of the downlink beam, such as one or more quasi-co-location (QCL) properties of the downlink beam. For example, a QCL property may be indicated using a qcl-Type indicator within a QCL-Info data structure as defined in 3GPP specifications and/or another standard. A QCL property may include, for example, a Doppler shift, a Doppler spread, an average delay, a delay spread, or spatial receive parameters, among other examples. In some aspects, a TCI state may be further associated with an antenna port, an antenna panel, and/or a TRP. A TCI state may be associated with one downlink reference signal set (for example, a synchronization signal block (SSB) and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). For example, the downlink reference signal may be indicated using a referenceSignal indicator within a QCL-Info data structure as defined in 3GPP specifications and/or another standard. In cases where the QCL type indicates spatial receive parameters, the QCL type may correspond to analog receive beamforming parameters of a UE receive beam at the UE 120a.

Accordingly, based at least in part on activating the TCI state associated with the non-serving cell 102e, the BS 110a may indicate to the UE 120a to also switch from a BWP associated with the serving cell 102a to a BWP associated with the non-serving cell 102e. As used herein, a "bandwidth part" or "BWP" may refer to a contiguous set of physical resource blocks (PRBs), where each PRB includes a set of frequencies corresponding to one or more subcarriers. A "subcarrier" may refer to a frequency based at least in part on a "carrier" frequency, and subcarriers may be aggregated to convey information wirelessly (e.g., using OFDM symbols and/or other RF symbols).

Additionally, or alternatively, the UE 120a may determine to switch, from the BWP associated with the serving cell 102a to the BWP associated with the non-serving cell 102e, based at least in part on the indication to activate the TCI state associated with the non-serving cell 102e. Although described with the BS 110a included in the serving cell 102a, aspects described herein similarly apply to the BS 110a being included in a different non-serving cell from the non-serving cell 102e that includes the BS 110e. In such aspects, the UE 120a may still receive activation of the TCI state, associated with the non-serving cell 102e that includes the BS 110e, from the BS 110a, or may receive the activation from the serving cell for the UE 120a.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile.

A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
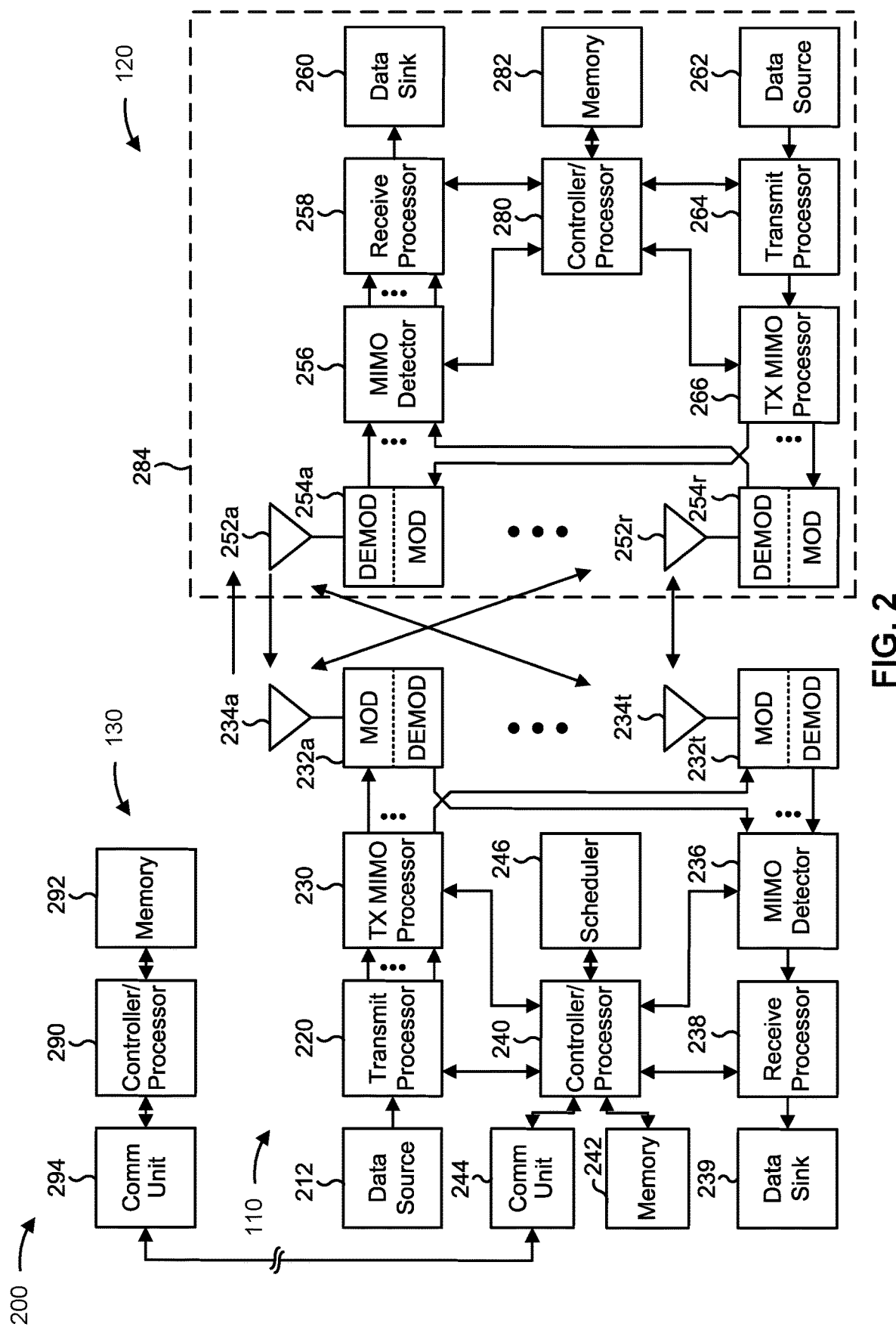
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with performing inter-cell mobility using BWP switching, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples. In some aspects, the network entity described herein is the base station 110, is included in the base station 110, or includes one or more components of the base station 110 shown in FIG. 2.

In some aspects, a UE (e.g., UE 120 and/or apparatus 900 of FIG. 9) may include means for receiving an indication to switch from a first TCI state associated with a first cell to a second TCI state associated with a second cell; and/or means for applying the second TCI state, including means for switching from a first BWP associated with the first cell to a second BWP associated with the second cell. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a network entity (e.g., base station 110 and/or apparatus 1000 of FIG. 10) may include means for transmitting, to a UE (e.g., the UE 120 and/or apparatus 900 of FIG. 9), an indication of a first TCI state associated with a first cell and a second TCI state associated with a second cell, wherein the first cell is associated with a first BWP and the second cell is associated with a second BWP; and/or means for transmitting, to the UE, an indication to switch from the first TCI state to the second TCI state, wherein the indication is associated with a switch from the first BWP to the second BWP. The means for the network entity to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
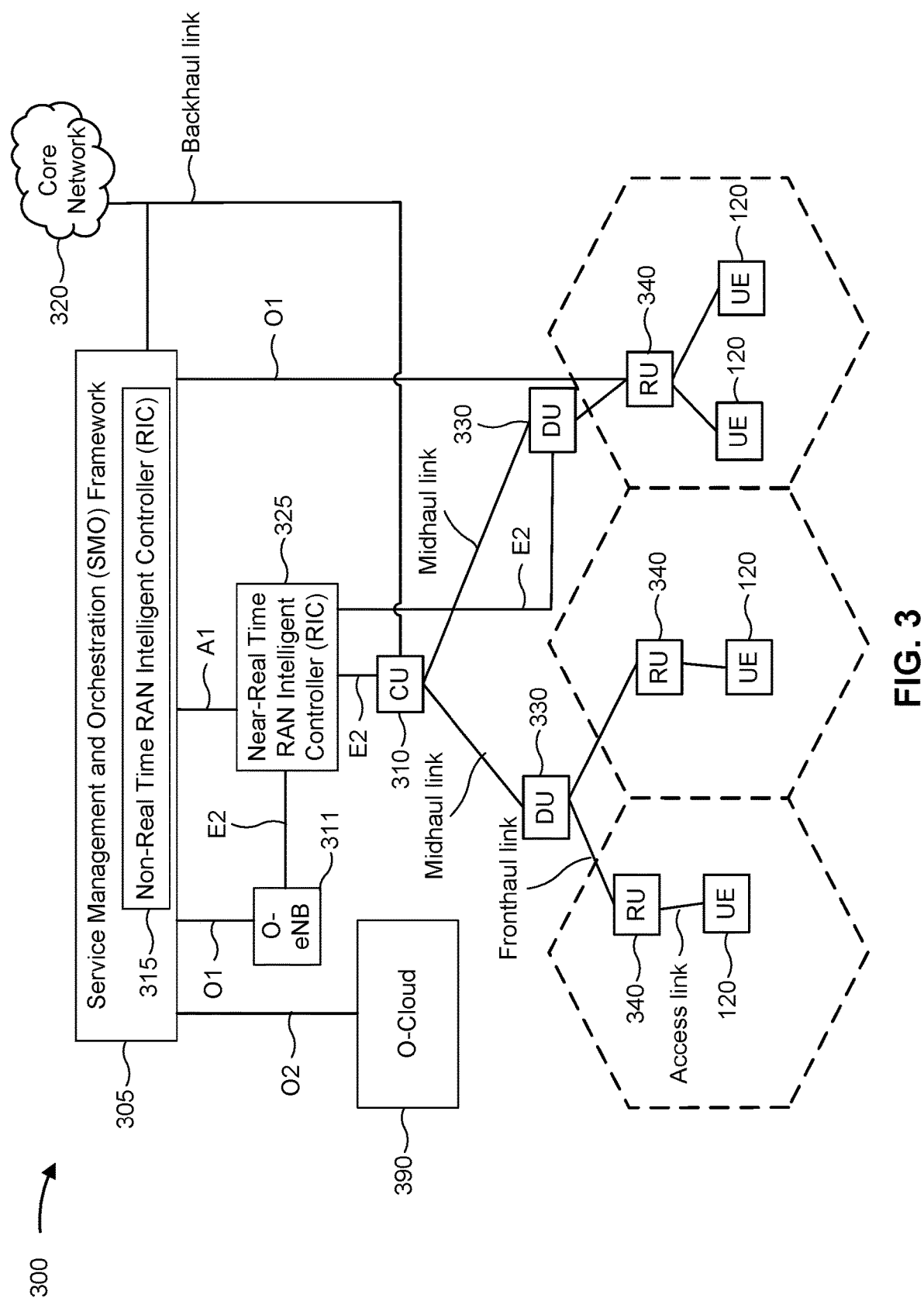
FIG. 3 is a diagram illustrating an example of a disaggregated base station architecture, in accordance with the present disclosure.

FIG. 3 is a diagram illustrating an example 300 disaggregated base station architecture, in accordance with the present disclosure. Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Generally, TCI states are associated with serving cells for a UE. However, TCI states may be associated with a non-serving cell for the UE such that the UE can perform measurements (e.g., periodic and/or aperiodic) on one or more reference signals associated with the non-serving cell. This allows the UE to switch to the non-serving cell (e.g., to enter a connected state with the non-serving cell) faster than if the UE had not previously performed the measurements. For example, the serving cell may indicate that the UE should switch to the non-serving cell, or a different non-serving cell may indicate that the UE should switch to the non-serving cell.

However, the non-serving cell may be associated with different parameters and/or configurations. For example, the non-serving cell may have a different identifier (e.g., a physical cell identifier (PCI), as defined in 3GPP specifications and/or another standard), which may be used to scramble sequences upon which the reference signal(s), associated with the non-serving cell, are based at least in part. Additionally, the non-serving cell may assign a different identifier to the UE (e.g., a cell radio network temporary identifier (C-RNTI), as defined in 3GPP specifications and/or another standard), which may be used to indicate which messages from the non-serving cell are intended for the UE. The non-serving cell may additionally or alternatively use different transmission configurations, such as a frequency raster or a subcarrier spacing (SCS). As used herein, a "frequency raster" may refer to step-wise frequency portions in which the non-serving cell transmits synchronization signals (e.g., primary synchronization signals (PSSs), secondary synchronization signals (SSSs), and/or physical broadcast channel (PBCH) messages, which may be grouped in an SSB), as spaced around a center frequency. The frequency raster may be aligned with a "channel raster" (e.g., step-wise frequency portions between neighboring channels on the non-serving cell), such as in LTE, or may be sparser, such as in 5G. Additionally, as used herein, a "subcarrier spacing" or "SCS" may refer to a range of frequencies (or an amount of bandwidth) between subcarriers used on the non-serving cell. Accordingly, the non-serving cell (or the serving cell) may indicate the different parameters and/or configurations to the UE, but this increases latency when the UE switches to the non-serving cell, and consumes processing resources, network overhead, and power.

Some techniques and apparatuses described herein enable a network entity (e.g., an RU 340 and/or a DU 330 or CU 310 instructing the RU 340) to map TCI states associated with one cell to a different BWP as compared with TCI states associated with a different cell. Each BWP may thus indicate parameters and/or configurations used on a corresponding cell associated with the BWP. Thus, a UE (e.g., UE 120) may switch BWPs when the UE 120 is instructed to apply a TCI state associated with a different cell. For example, a serving cell may indicate that the UE 120 should apply a TCI state associated with a non-serving cell, such that the UE 120 also switches to a BWP associated with the non-serving cell. Similarly, a first non-serving cell may indicate that the UE 120 should apply a TCI state associated with a second non-serving cell, such that the UE 120 also switches to a BWP associated with the second non-serving cell. As a result, the network entity reduces latency between the UE 120 switching to a new cell and the UE 120 using correct parameters and/or configurations to communicate on the new cell. Additionally, the network entity and the UE 120 conserve processing resources, network overhead, and power as compared with the network entity indicating different parameters and/or configurations associated with the new cell during or after the UE 120 has switched to the new cell.

Figure 4:
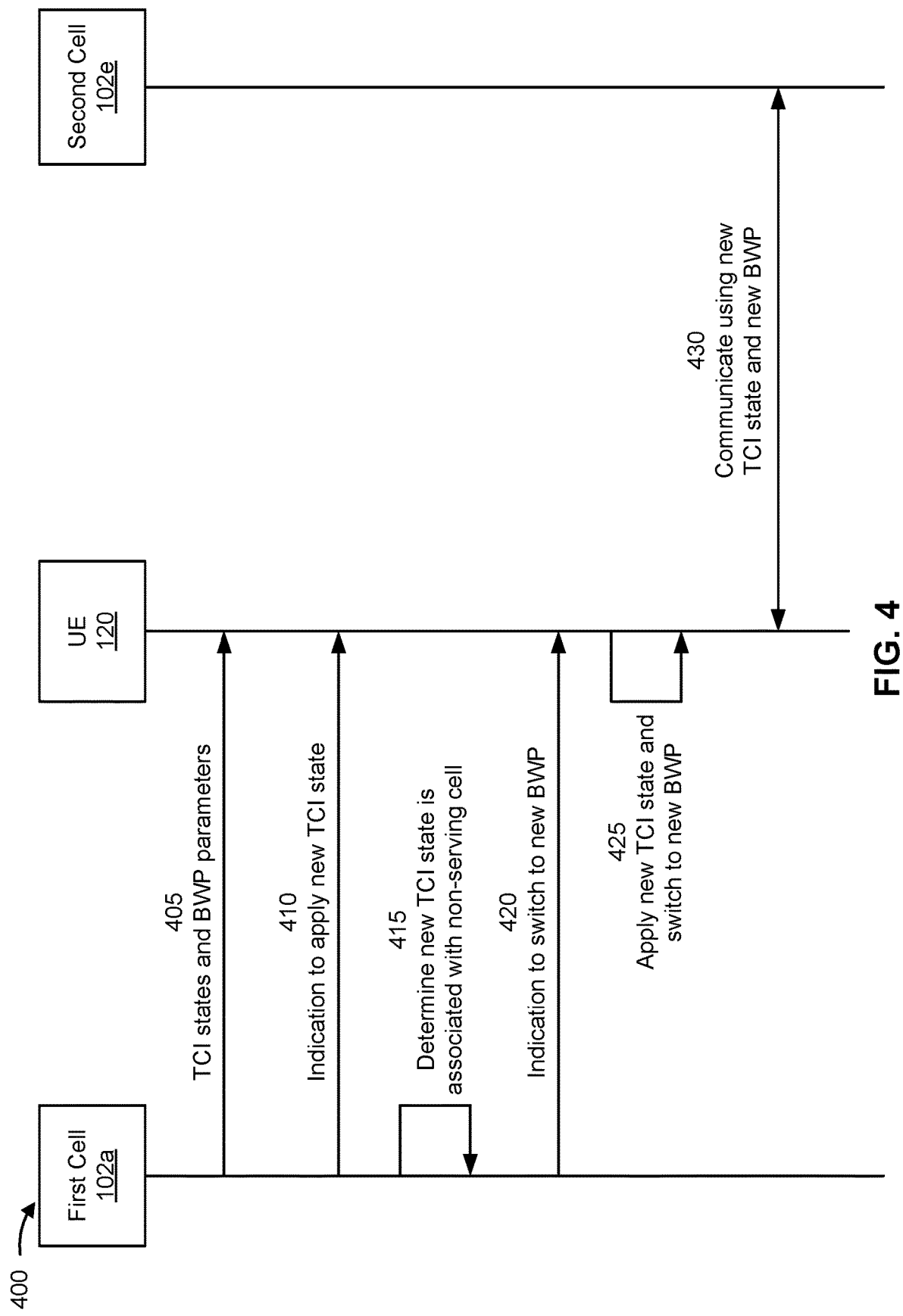
FIGS. 4 and 5 are diagrams illustrating examples associated with performing inter-cell mobility using bandwidth part (BWP) switching, in accordance with the present disclosure.

FIG. 4 is a diagram illustrating an example 400 associated with performing inter-cell mobility using BWP switching, in accordance with the present disclosure. As shown in FIG. 4, a UE 120 may communicate with a first cell 102*a* (e.g. including one or more first network entities) and a second cell 102*e* (e.g., including one or more second network entities). In some aspects, the first cell 102*a* is a serving cell, and the second cell 102*e* is a non-serving cell. As an alternative, the first cell 102*a* is a non-serving cell, and the second cell 102*e* is a different non-serving cell.

As shown in connection with reference number 405, the first cell 102*a* may transmit, and the UE 120 may receive, an indication of at least a first TCI state and a second TCI state. For example, the first cell 102*a* may transmit an RRC message (e.g., including a tci-StatesToAddModList table as defined in 3GPP specifications and/or another standard) that indicates at least the first TCI state and the second TCI state. In some aspects, the first cell 102*a* may additionally or alternatively transmit a control element (e.g., a medium access control (MAC) layer control element (MAC-CE)) that indicates at least the first TCI state and the second TCI state.

In some aspects, the first TCI state may be associated with the first cell 102*a*. Accordingly, the first cell 102*a* may activate the first TCI state (e.g., via downlink control information (DCI)) such that the UE 120 may communicate with the first cell 102*a* using the first TCI state (e.g., receive control information and/or data from the first cell 102*a* on a physical downlink control channel (PDCCH) and/or a physical downlink shared channel (PDSCH), respectively, and/or transmit control information and/or data to the first cell 102*a* on a physical uplink control channel (PUCCH) and/or a physical uplink shared channel (PUSCH), respectively).

In some aspects, the first cell 102*a* may further transmit, and the UE 120 may receive, an indication that the first TCI state is associated with the first cell 102*a* and that the second TCI state is associated with the second cell 102*e*. For example, a data structure associated with the first TCI state (e.g., a TCI-State data structure and/or a QCL-Info data structure, as defined in 3GPP specifications and/or another standard) may include an identifier (e.g., a PCI and/or another identifier) associated with the first cell 102a. Similarly, a data structure associated with the second TCI state (e.g., a TCI-State data structure and/or a QCL-Info data structure, as defined in 3GPP specifications and/or another standard) may include an identifier (e.g., a PCI and/or another identifier) associated with the second cell 102e. Additionally, or alternatively, the first TCI state may be implicitly associated with the first cell 102a. For example, the first TCI state may be associated with a reference signal that is included in a BWP associated with the first cell 102a, such as the first BWP described below. Additionally, or alternatively, the reference signal may be otherwise associated with the first cell 102a, such as via the inclusion of an identifier (e.g., a PCI and/or another identifier), associated with the first cell 102a, in an NZP-CSI-RS-Resource data structure (e.g., as defined by 3GPP specifications and/or another standard) that indicates the reference signal. Similarly, the second TCI state may be implicitly associated with the second cell 102e.

As further shown in connection with reference number 405, the first cell 102a may further transmit, and the UE 120 may receive, an indication of at least a first BWP and a second BWP. For example, the first cell 102a may transmit an RRC message (e.g., including a downlinkBWP-ToAdd-ModList table and/or an uplinkBWP-ToAddModList, as defined in 3GPP specifications and/or another standard) that indicates at least the first BWP and the second BWP. In some aspects, the first BWP may be associated with the first cell 102a. Accordingly, the first cell 102a may activate the first BWP (e.g., via DCI) such that the UE 120 may communicate with the first cell 102a using the first BWP (e.g., receive control information and/or data from the first cell 102a on a PDCCH and/or a PDSCH, respectively, and/or transmit control information and/or data to the first cell 102a on a PUCCH and/or a PUSCH, respectively).

In some aspects, the first cell 102a may further transmit, and the UE 120 may receive, an indication that the first BWP is associated with the first cell 102a and that the second BWP is associated with the second cell 102e. For example, a data structure associated with the first BWP (e.g., a BWP data structure, as defined in 3GPP specifications and/or another standard) may include an identifier (e.g., a PCI and/or another identifier) associated with the first cell 102a. Similarly, a data structure associated with the second BWP (e.g., a BWP data structure, as defined in 3GPP specifications and/or another standard) may include an identifier (e.g., a PCI and/or another identifier) associated with the second cell 102e.

Additionally, or alternatively, the UE 120 may determine, based at least in part on one or more rules stored in a memory of the UE 120, that the first BWP is associated with the first cell 102a and that the second BWP is associated with the second cell 102e. For example, the UE 120 may be programmed (and/or otherwise preconfigured) with the rule(s) (e.g., according to 3GPP specifications and/or another standard) that accept the BWPs and/or the cells as input, and output a mapping between the BWPs and the cells. In one example, the rule(s) may indicate that the BWPs are mapped, consecutively according to increasing or decreasing frequencies, to the cells in order of increasing or decreasing identifiers (e.g., PCIs and/or other identifiers) for the cells. In another example, the rule(s) may indicate that the BWPs are mapped, according to increasing or decreasing frequencies, to the cells based on increasing or decreasing distances of base stations within those cells to the UE 120.

In a combinatory example, the first cell 102a may indicate a selection of a subset from a set of rules according to which the UE 120 should map the BWPs to the cells. In another combinatory example, the first cell 102a may indicate which BWPs are associated with the first cell 102a (and/or with other cells) such that the UE 120 may infer that remaining BWPs are associated with the second cell 102e (and/or with other cells).

In some aspects, the first BWP may be associated with RRC parameters for the first cell 102a, and the second BWP may be associated with RRC parameters for the second cell 102e. The RRC parameters for the first cell 102a may include a frequency raster (e.g., a locationAndBandwidth indicator included in a BWP data structure, as defined in 3GPP specifications and/or another standard), an SCS (e.g., a subcarrierSpacing indicator included in a BWP data structure, as defined in 3GPP specifications and/or another standard), a cell identifier (e.g., a PCI, a C-RNTI for the UE 120, and/or another identifier) associated with the first cell 102a, or a combination thereof. Similarly, the RRC parameters for the second cell 102e may include a frequency raster, an SCS, a cell identifier (e.g., a PCI, a C-RNTI for the UE 120, and/or another identifier) associated with the second cell 102e, or a combination thereof.

In some aspects, the first BWP may be associated with RRC parameters common to the first cell 102a and the second cell 102e, with cell-specific RRC parameters for the first cell 102a, and with cell-specific RRC parameters for the second cell 102e. Additionally, or alternatively, the second BWP may be associated with RRC parameters common to the first cell 102a and the second cell 102e, with cell-specific RRC parameters for the first cell 102a, and with cell-specific RRC parameters for the second cell 102e. In any of the aspects described above, the RRC parameters common to the first cell 102a and the second cell 102e may include a frequency raster, an SCS, and/or another transmission parameter shared by the first cell 102a and the second cell 102e. Accordingly, the cell-specific RRC parameters for the first cell 102a may include a cell identifier (e.g., a PCI, a C-RNTI for the UE 120, and/or another identifier) associated with the first cell 102a and/or any transmission parameter used by the first cell 102a but not the second cell 102e. Similarly, the cell-specific RRC parameters for the second cell 102e may include a cell identifier (e.g., a PCI, a C-RNTI for the UE 120, and/or another identifier) associated with the second cell 102e and/or any transmission parameter used by the second cell 102e but not the first cell 102a.

In some aspects, the mapping between BWPs and cells may be one-to-one. For example, as described above, the first BWP may be mapped to the first cell 102a, and the second BWP may be mapped to the second cell 102e. Additionally, or alternatively, at least a portion of the mapping between BWPs and cells may be many-to-one. For example, a first plurality of BWPs, including the first BWP, may be associated with the first cell 102a, and/or a second plurality of BWPs, including the second BWP, may be associated with the second cell 102e. Additionally, or alternatively, at least a portion of the mapping between BWPs and cells may be one-to-many. For example, at least one BWP, of the first BWP and the second BWP, may be associated with both the first cell 102a and with the second cell 102e.

Although described above with the first cell 102a transmitting the indication(s), the description similarly applies to a serving cell transmitting the indication(s), where the first cell 102a and the second cell 102e are both non-serving cells.

As shown in connection with reference number 410, the first cell 102a may transmit, and the UE 120 may receive, an indication to switch from the first TCI state to the second TCI state. For example, the first cell 102a may transmit an RRC message, a MAC-CE, and/or DCI indicating that the second TCI state is activated.

Additionally, as shown in connection with reference number 415, the first cell 102a may determine, based at least in part on one or more rules stored in a memory of a network entity (e.g., an RU 340 and/or a DU 330 or CU 310 instructing the RU 340) included in the first cell 102a, that the first BWP is associated with the first cell 102a and that the second BWP is associated with the second cell 102e. For example, the network entity may use the rule(s) as described above to determine that the first BWP is associated with the first cell 102a and that the second BWP is associated with the second cell 102e.

Accordingly, as shown in connection with reference number 420, the first cell 102a may transmit, and the UE 120 may receive, an indication to switch from the first BWP to the second BWP. For example, the first cell 102a may transmit the indication, to switch from the first BWP to the second BWP, based at least in part on determining that the second TCI state is associated with a reference signal from the second cell 102e. In some aspects, the first cell 102a may transmit an RRC message, a MAC-CE, and/or DCI instructing the UE 120 to switch to the second BWP.

As shown in connection with reference number 425, the UE 120 may apply the second TCI state. For example, the UE 120 may apply the second TCI state based at least in part on the indication to switch from the first TCI state to the second TCI state. In some aspects, the UE 120 may apply the second TCI state by adjusting one or more antennas, a modulator, a demodulator, and/or other receive/transmit hardware based at least in part on the second TCI state. Additionally, the UE 120 may further switch from the first BWP to the second BWP. For example, the UE 120 may switch to the second BWP based at least in part on the indication to switch from the first BWP to the second BWP. In some aspects, the UE 120 may switch to the second BWP by adjusting one or more antennas, a modulator, a demodulator, and/or other receive/transmit hardware to use the second BWP rather than the first BWP.

In some aspects, the second TCI state is applied within an application time that is a maximum of a first application time associated with the second TCI state and a second application time associated with the second BWP. For example, 3GPP specifications and/or another standard may define the application time associated with applying the second TCI state and the application time associated with switching to the second BWP. Accordingly, the first cell 102a (and the second cell 102e) may refrain from transmitting to the UE 120 during the application time.

As an alternative, the second TCI state may be applied within a joint application time. For example, the joint application time may be based at least in part on an SCS associated with the first BWP and an SCS associated with the second BWP, when the first cell and the second cell use a same component carrier (CC). Accordingly, in one example, the joint application time may be longer when a difference between the SCSs is larger. In another example, the joint application time may be based at least in part on an SCS associated with a CC carrying the indication to switch from the first TCI state to the second TCI state and/or the indication to switch from the first BWP to the second BWP, and an SCS associated with a CC for the second BWP, when the first cell and the second cell use different CCs. Accordingly, in one example, the joint application time may be longer when a difference between the SCSs is larger. The first cell 102a (and the second cell 102e) may refrain from transmitting to the UE 120 during the joint application time.

As shown in connection with reference number 430, the UE 120 may communicate with the second cell 102e using the second TCI state and the second BWP. For example, the UE 120 may receive control information and/or data from the second cell 102e on a PDCCH and/or a PDSCH, respectively, using the second TCI state and the second BWP. Additionally, or alternatively, the UE 120 may transmit control information and/or data to the second cell 102e on a PUCCH and/or a PUSCH, respectively, using the second TCI state and the second BWP.

By using techniques as described in connection with FIG. 4, the first cell 102a (or a different serving cell) reduces latency between the UE 120 switching to the second cell 102e and the UE 120 using correct parameters and/or configurations to communicate on the second cell 102e. Additionally, the first cell 102a (or different serving cell), the second cell 102e, and the UE 120 conserves processing resources, network overhead, and power as compared with the first cell 102a (or different serving cell) and/or the second cell 102e indicating different parameters and/or configurations associated with the second cell 102e during or after the UE 120 has switched to the second cell 102e.

As indicated above, FIG. 4 is provided as an example. Other examples may differ from what is described with respect to FIG. 4.

Figure 5:
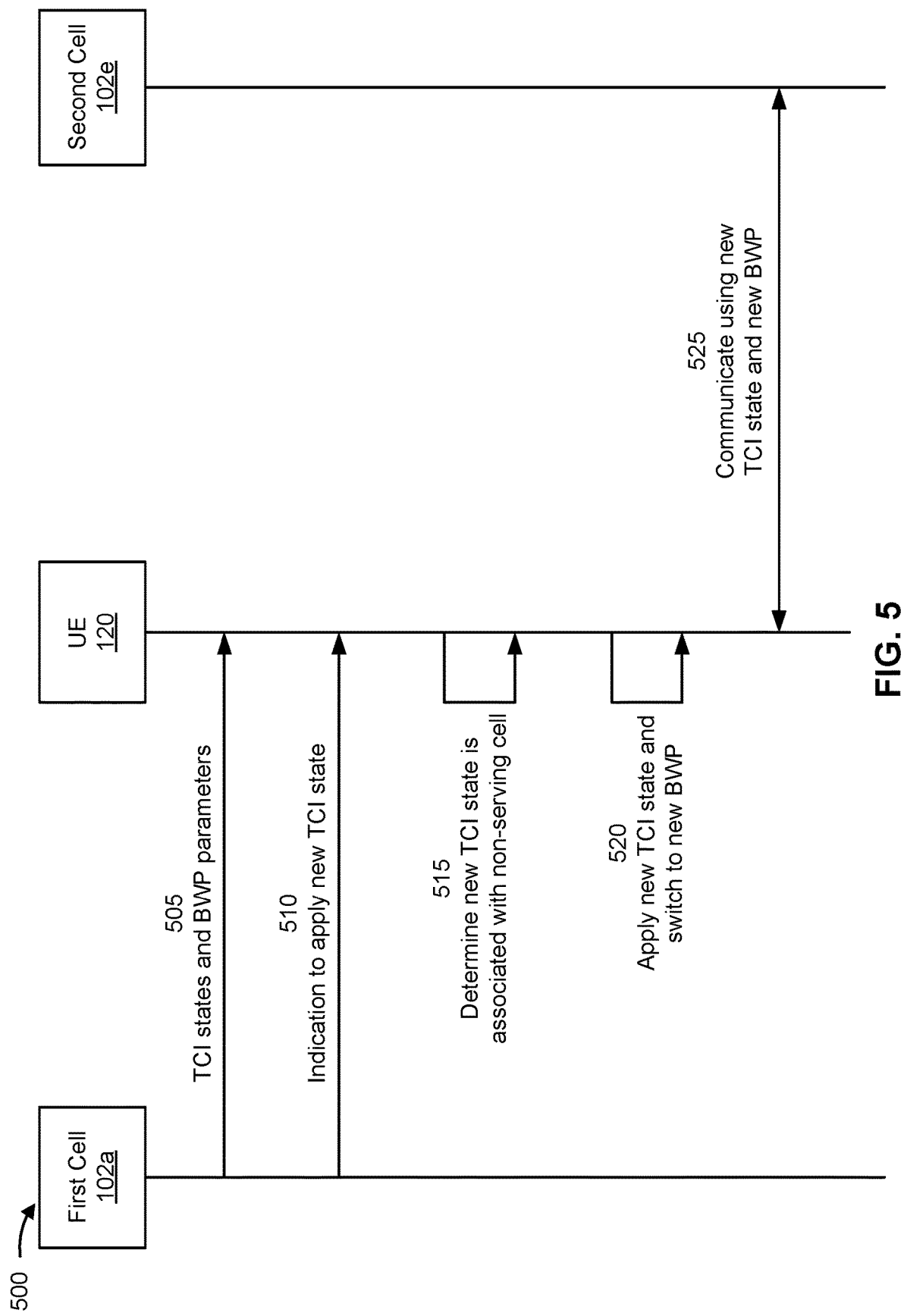

FIG. 5 is a diagram illustrating an example 500 associated with performing inter-cell mobility using BWP switching, in accordance with the present disclosure. As shown in FIG. 5, a UE 120 may communicate with a first cell 102a (e.g. including one or more network entities) and a second cell 102e (e.g., including one or more network entities). In some aspects, the first cell 102a is a serving cell, and the second cell 102e is a non-serving cell. As an alternative, the first cell 102a is a non-serving cell, and the second cell 102e is a different non-serving cell.

As shown in connection with reference number 505, the first cell 102a may transmit, and the UE 120 may receive, an indication of at least a first TCI state and a second TCI state. For example, the first cell 102a may transmit the indication as described above in connection with reference number 405 of FIG. 4. In some aspects, the first cell 102a may further transmit, and the UE 120 may receive, an indication that the first TCI state is associated with the first cell 102a and that the second TCI state is associated with the second cell 102e (e.g., as described above in connection with FIG. 3). Additionally, or alternatively, the first TCI state may be implicitly associated with the first cell 102a, and/or the second TCI state may be implicitly associated with the second cell 102e (e.g., as described above in connection with FIG. 4).

As further shown in connection with reference number 505, the first cell 102a may further transmit, and the UE 120 may receive, an indication of at least a first BWP and a second BWP. For example, the first cell 102a may transmit the indication as described above in connection with reference number 405 of FIG. 4. In some aspects, the first cell 102a may further transmit, and the UE 120 may receive, an indication that the first BWP is associated with the first cell 102a and that the second BWP is associated with the second cell 102e (e.g., as described above in connection with FIG. 4). Additionally, or alternatively, the UE 120 may determine, based at least in part on one or more rules stored in a memory of the UE 120, that the first BWP is associated with the first cell 102*a* and that the second BWP is associated with the second cell 102*e* (e.g., as described above in connection with FIG. 4).

Although described above with the first cell 102*a* transmitting the indication(s), the description similarly applies to a serving cell transmitting the indication(s), where the first cell 102*a* and the second cell 102*e* are both non-serving cells.

As shown in connection with reference number 510, the first cell 102*a* may transmit, and the UE 120 may receive, an indication to switch from the first TCI state to the second TCI state. For example, the first cell 102*a* may transmit an RRC message, a MAC-CE, and/or DCI indicating that the second TCI state is activated.

Accordingly, as shown in connection with reference number 515, the UE 120 may determine, based at least in part on one or more rules stored in the memory of the UE 120, that the first BWP is associated with the first cell 102*a* and that the second BWP is associated with the second cell 102*e*. For example, the UE 120 may use the rule(s) as described above to determine that the first BWP is associated with the first cell 102*a* and that the second BWP is associated with the second cell 102*e*.

Accordingly, as shown in connection with reference number 520, the UE 120 may apply the second TCI state. For example, the UE 120 may apply the second TCI state based at least in part on the indication to switch from the first TCI state to the second TCI state. In some aspects, the UE 120 may apply the second TCI state by adjusting one or more antennas, a modulator, a demodulator, and/or other receive/transmit hardware based at least in part on the second TCI state. Additionally, the UE 120 may further switch from the first BWP to the second BWP. For example, the UE 120 may switch to the second BWP based at least in part on determining that the second TCI state is associated with a reference signal from the second cell 102*e*. In some aspects, the UE 120 may switch to the second BWP by adjusting one or more antennas, a modulator, a demodulator, and/or other receive/transmit hardware to use the second BWP rather than the first BWP.

In some aspects, the second TCI state is applied within an application time that is a maximum of a first application time associated with the second TCI state and a second application time associated with the second BWP (e.g., as described above in connection with FIG. 4). Accordingly, the first cell 102*a* (and the second cell 102*e*) may refrain from transmitting to the UE 120 during the application time. As an alternative, the second TCI state may be applied within a joint application time (e.g., as described above in connection with FIG. 4). Accordingly, the first cell 102*a* (and the second cell 102*e*) may refrain from transmitting to the UE 120 during the joint application time.

As shown in connection with reference number 525, the UE 120 may communicate with the second cell 102*e* using the second TCI state and the second BWP. For example, the UE 120 may receive control information and/or data from the second cell 102*e* on a PDCCH and/or a PDSCH, respectively, using the second TCI state and the second BWP. Additionally, or alternatively, the UE 120 may transmit control information and/or data to the second cell 102*e* on a PUCCH and/or a PUSCH, respectively, using the second TCI state and the second BWP.

By using techniques as described in connection with FIG. 5, the first cell 102*a* (or a different serving cell) reduces latency between the UE 120 switching to the second cell 102*e* and the UE 120 using correct parameters and/or configurations to communicate on the second cell 102*e*. Additionally, the first cell 102*a* (or different serving cell), the second cell 102*e*, and the UE 120 conserves processing resources, network overhead, and power as compared with the first cell 102*a* (or different serving cell) and/or the second cell 102*e* indicating different parameters and/or configurations associated with the second cell 102*e* during or after the UE 120 has switched to the second cell 102*e*.

As indicated above, FIG. 5 is provided as an example. Other examples may differ from what is described with respect to FIG. 5.

Figure 6:
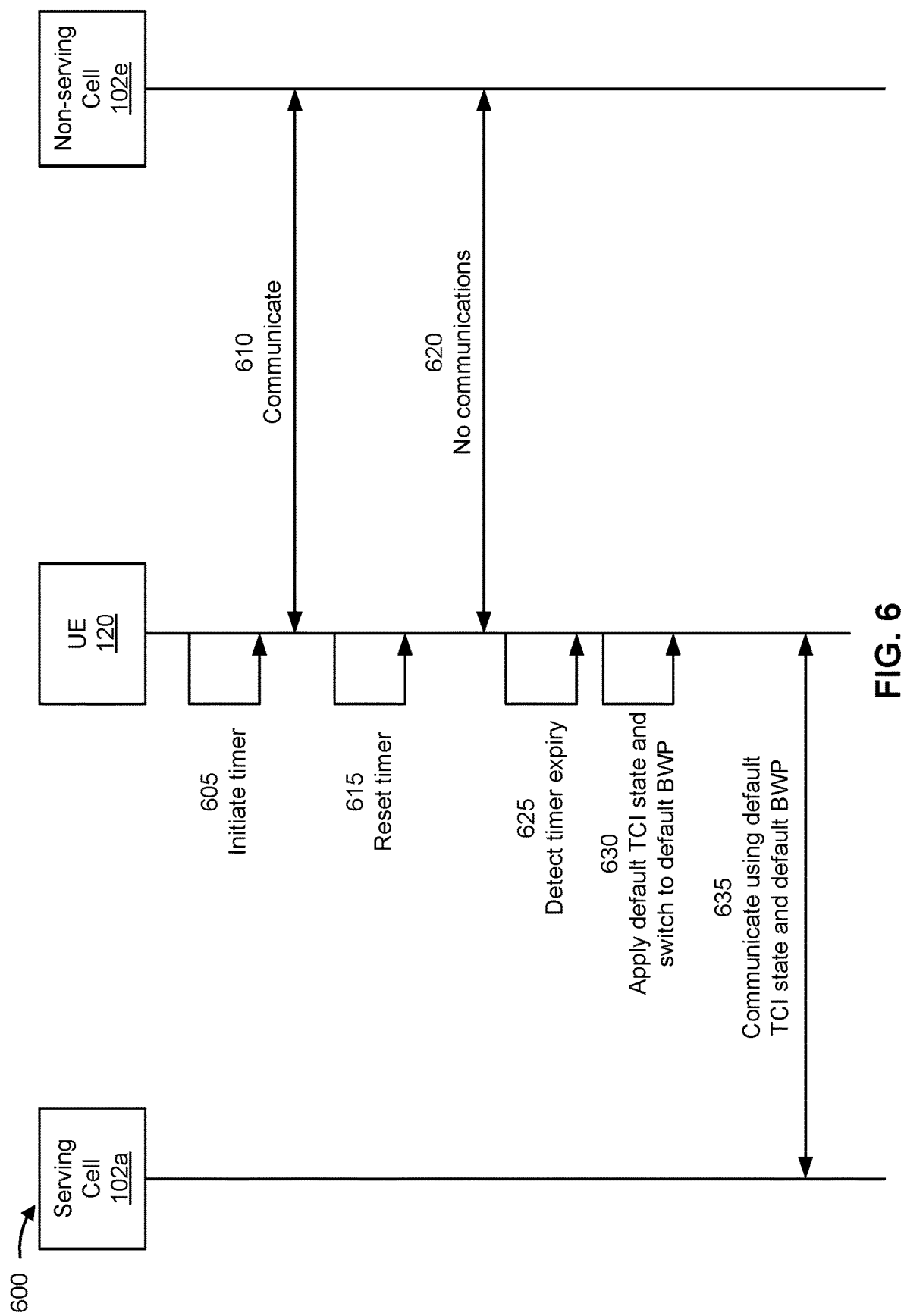
FIG. 6 is a diagram illustrating an example associated with BWP switching using a timer, in accordance with the present disclosure.

FIG. 6 is a diagram illustrating an example 600 associated with BWP switching using a timer, in accordance with the present disclosure. As shown in FIG. 6, a UE 120 may communicate with a serving cell 102*a* (e.g. including one or more network entities) and a non-serving cell 102*e* (e.g., including one or more network entities). In some aspects, the UE 120 may have switched to the non-serving cell 102*e* from the serving cell 102*a*. As an alternative, UE 120 may have switched to the non-serving cell 102*e* from another non-serving cell. Accordingly, example 600 may be implemented by a UE 120 in combination with example 400 of FIG. 4 and/or example 500 of FIG. 5. For example, the UE 120 may perform operations associated with example 600 after performing operations associated with example 400 of FIG. 4 and/or example 500 of FIG. 5.

As shown in connection with reference number 605, the UE 120 may initiate a timer. In some aspects, the timer may be associated with a second BWP to which the UE 120 switched (e.g., as described above in connection with FIG. 4 and/or FIG. 5). The UE 120 may have switched from a default BWP associated with the serving cell 102*a* or from a first BWP associated with a different non-serving cell than non-serving cell 102*e*. The UE 120 may have switched to the second BWP based at least in part on applying a second TCI state associated with the second BWP. The UE 120 may have switched from a default TCI associated with the serving cell 102*a* or from a first TCI state associated with a different non-serving cell than non-serving cell 102*e*.

As shown in connection with reference number 610, the UE 120 may communicate with the non-serving cell 102*e* using the second TCI state and the second BWP. For example, the UE 120 may receive control information and/or data from the non-serving cell 102*e* on a PDCCH and/or a PDSCH, respectively, using the second TCI state and the second BWP. Additionally, or alternatively, the UE 120 may transmit control information and/or data to the non-serving cell 102*e* on a PUCCH and/or a PUSCH, respectively, using the second TCI state and the second BWP.

Accordingly, as shown in connection with reference number 615, the UE 120 may reset the timer based at least in part on transmitting data or control information to the non-serving cell 102*e* and/or receiving data or control information from the non-serving cell 102*e*. In some aspects, the UE 120 may refrain from resetting the timer when the UE 120 measures a periodic reference signal from the non-serving cell 102*e* and/or measures an aperiodic reference signal from the non-serving cell 102*e*. Accordingly, the UE 120 may additionally refrain from resetting the timer when the UE 120 receives a configuration message associated with a periodic reference signal and/or an aperiodic reference signal from the non-serving cell 102*e* and/or transmits a report associated with a periodic reference signal and/or an aperiodic reference signal to the non-serving cell 102*e*.

As shown in connection with reference number 620, the UE 120 may not communicate with the non-serving cell 102*e* for a threshold amount of time (e.g., the timer being set and reset based at least in part on the threshold amount of time). For example, the UE 120 may not receive control information and/or data from the non-serving cell 102e on a PDCCH and/or a PDSCH, respectively, using the second TCI state and the second BWP, for the threshold amount of time. Additionally, the UE 120 may not transmit control information and/or data to the non-serving cell 102e on a PUCCH and/or a PUSCH, respectively, using the second TCI state and the second BWP, for the threshold amount of time.

Accordingly, as shown in connection with reference number 625, the UE 120 may detect expiry of the timer. For example, the timer may expire because the UE 120 did not communicate with the non-serving cell 102e for the threshold amount of time. As described above, the timer may expire even if, during the threshold amount of time, the UE 120 measures a periodic reference signal from the non-serving cell 102e, measures an aperiodic reference signal from the non-serving cell 102e, receives a configuration message associated with a periodic reference signal and/or an aperiodic reference signal from the non-serving cell 102e, and/or transmits a report associated with a periodic reference signal and/or an aperiodic reference signal to the non-serving cell 102e.

As shown in connection with reference number 630, the UE 120 may apply the default TCI state. For example, the UE 120 may apply the default TCI state based at least in part on the expiry of the timer. The default TCI state may have been indicated by the serving cell 102a (e.g., in an RRC message, a MAC-CE, and/or a DCI) to the UE 120. In some aspects, the UE 120 may apply the default TCI state by adjusting one or more antennas, a modulator, a demodulator, and/or other receive/transmit hardware based at least in part on the default TCI state.

Additionally, the UE 120 may further switch from the second BWP to the default BWP. For example, the UE 120 may switch to the default BWP based at least in part on expiry of the timer. The default BWP state may have been indicated by the serving cell 102a (e.g., in an RRC message, a MAC-CE, and/or a DCI) to the UE 120. In some aspects, the UE 120 may switch to the default BWP by adjusting one or more antennas, a modulator, a demodulator, and/or other receive/transmit hardware to use the default BWP rather than the second BWP.

In some aspects, the default TCI state is applied within an application time that is a maximum of a first application time associated with the default TCI state and a second application time associated with the default BWP (e.g., similar to the application time described above in connection with FIG. 4). Accordingly, the serving cell 102a (and the non-serving cell 102e) may refrain from transmitting to the UE 120 during the application time. As an alternative, the default TCI state may be applied within a joint application time (e.g., similar to the joint application time described above in connection with FIG. 4). Accordingly, the serving cell 102a (and the non-serving cell 102e) may refrain from transmitting to the UE 120 during the joint application time.

As shown in connection with reference number 635, the UE 120 may communicate with the serving cell 102a using the default TCI state and the default BWP. For example, the UE 120 may receive control information and/or data from the serving cell 102a on a PDCCH and/or a PDSCH, respectively, using the default TCI state and the default BWP. Additionally, or alternatively, the UE 120 may transmit control information and/or data to the serving cell 102a on a PUCCH and/or a PUSCH, respectively, using the default TCI state and the default BWP.

By using techniques as described in connection with FIG. 6, the serving cell 102a and the UE 120 conserve processing resources, network overhead, and power as compared with the serving cell 102a having to manually switch the UE 120 back to the default TCI state and the default BWP when the non-serving cell 102e does not schedule any transmissions to or from the UE 120 for a threshold amount of time.

As indicated above, FIG. 6 is provided as an example. Other examples may differ from what is described with respect to FIG. 6.

Figure 7:
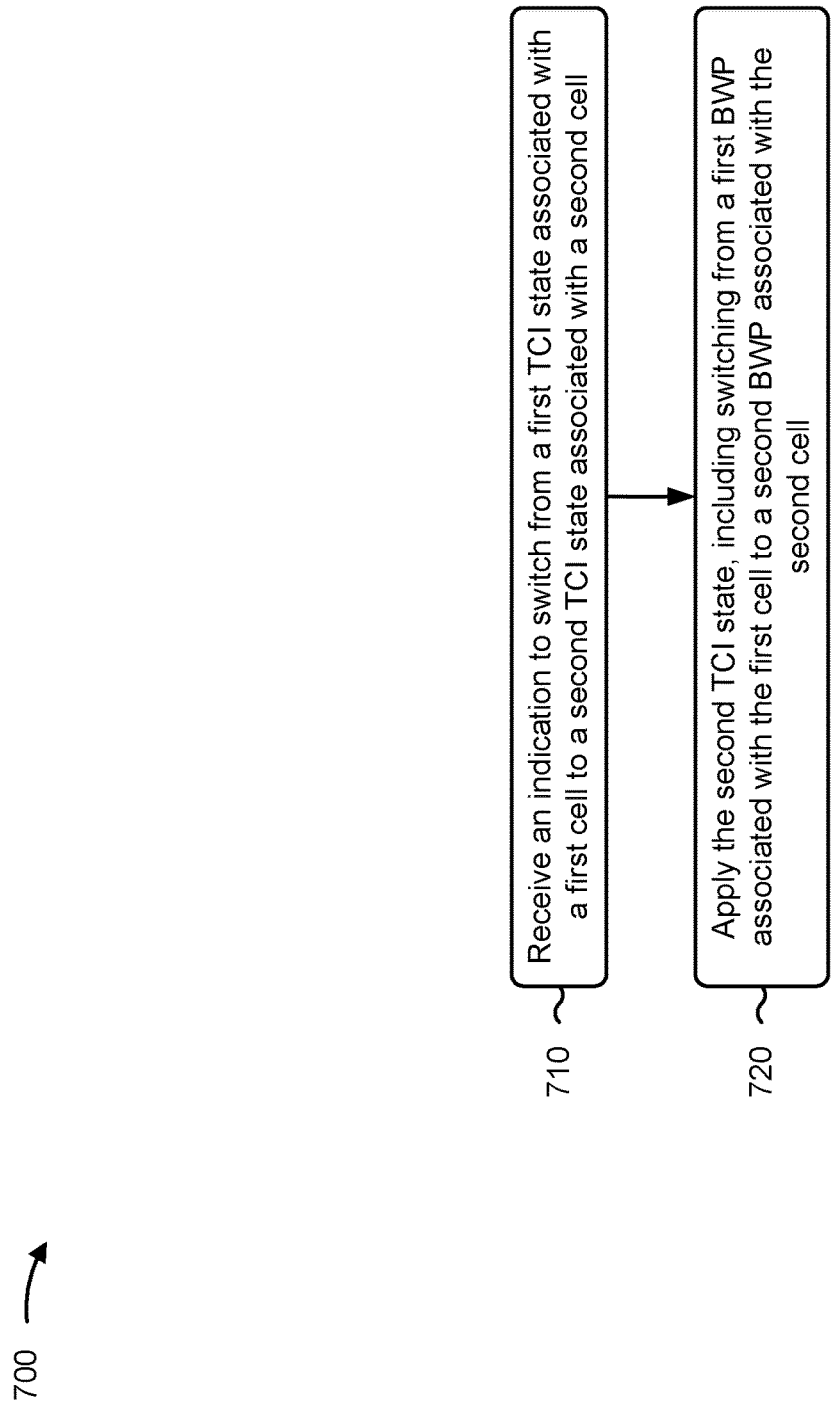
FIGS. 7 and 8 are diagrams illustrating example processes associated with performing inter-cell mobility using BWP switching, in accordance with the present disclosure.

FIG. 7 is a diagram illustrating an example process 700 performed, for example, by a UE, in accordance with the present disclosure. Example process 700 is an example where the UE (e.g., UE 120 and/or apparatus 900 of FIG. 9) performs operations associated with performing inter-cell mobility using BWP part switching.

Figure 9:
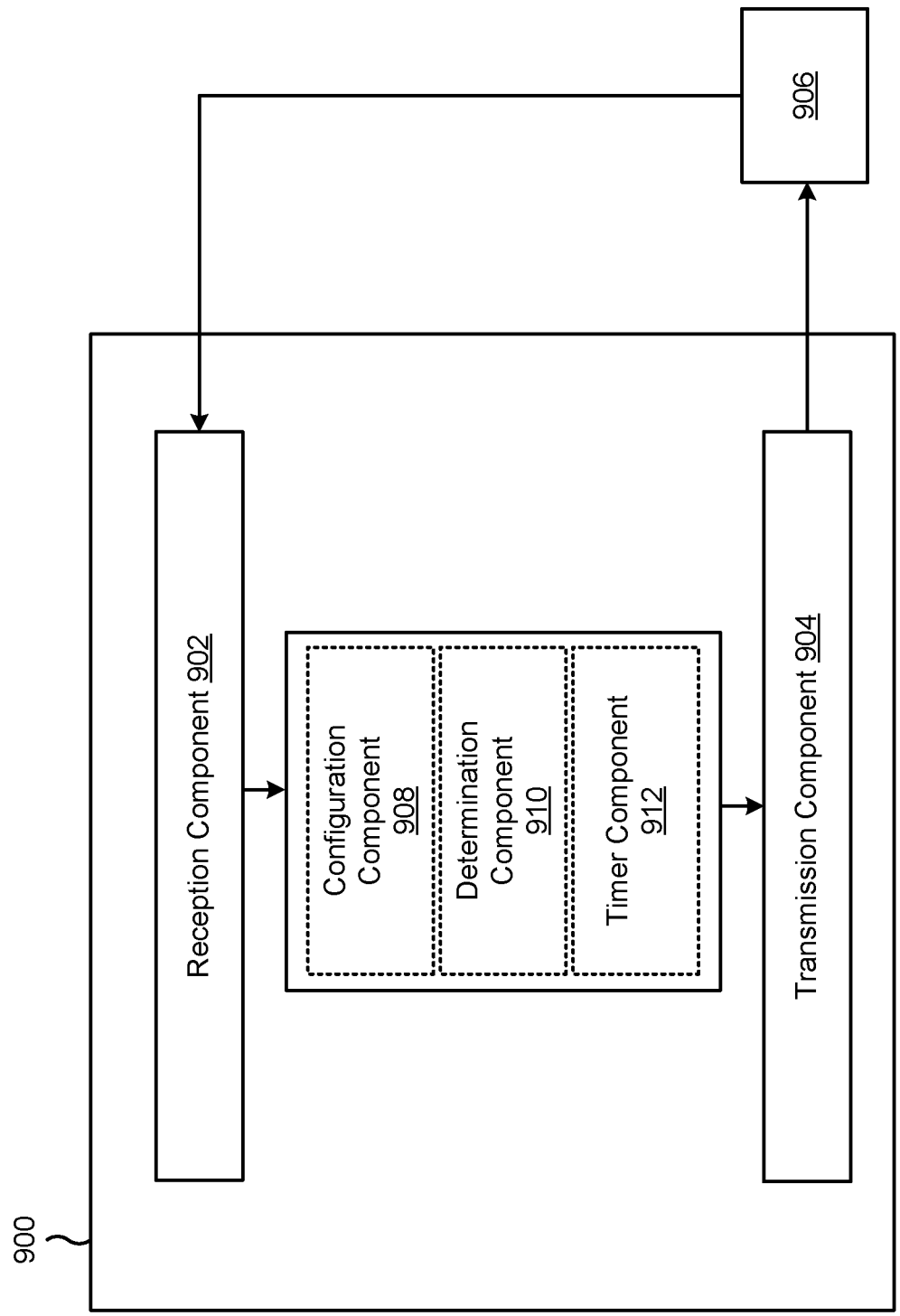
FIGS. 9 and 10 are diagrams of example apparatuses for wireless communication, in accordance with the present disclosure.
Figure 10:
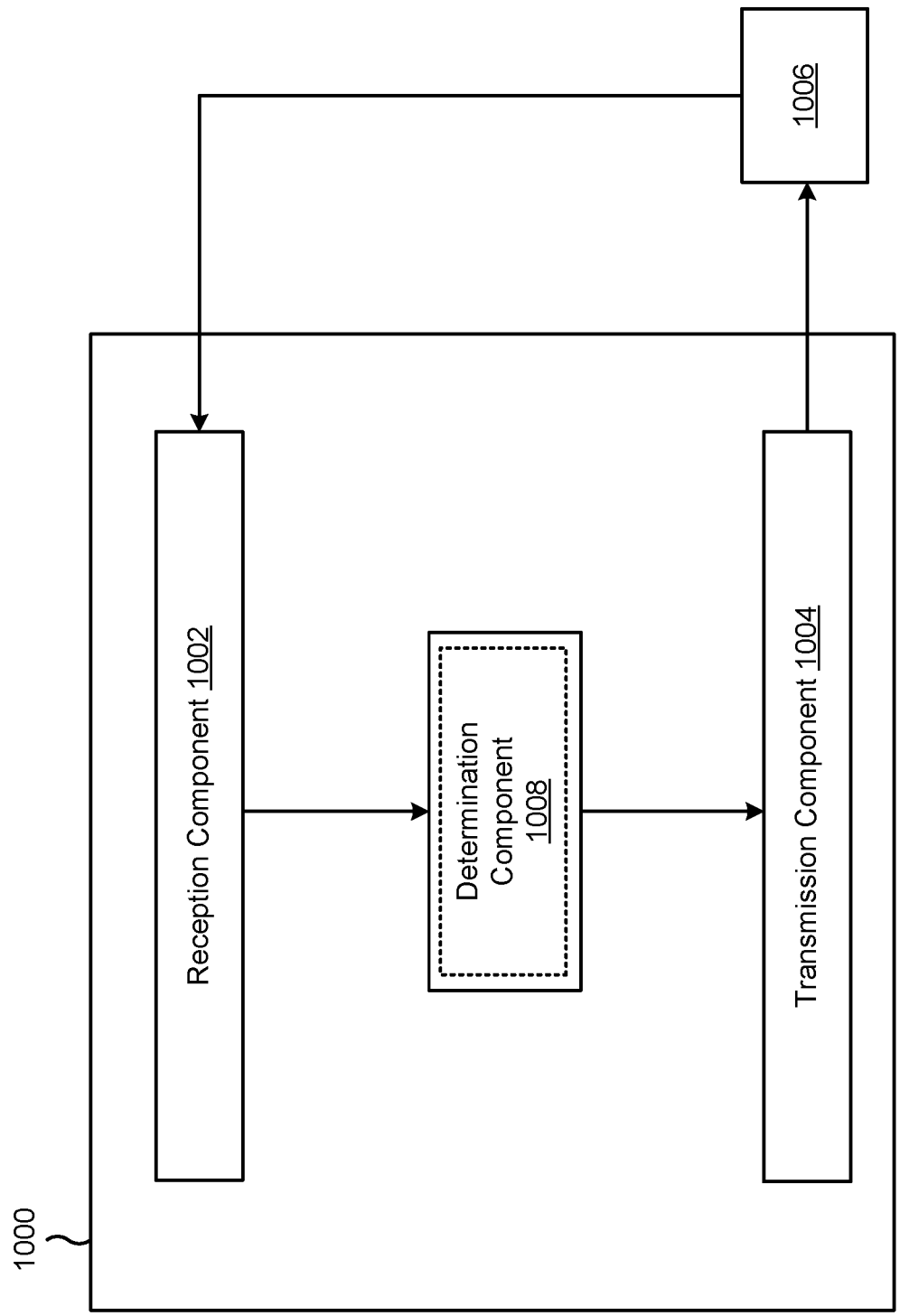

As shown in FIG. 7, in some aspects, process 700 may include receiving an indication to switch from a first TCI state associated with a first cell (e.g., first cell 102a including a network entity and/or an apparatus 900 of FIG. 9) to a second TCI state associated with a second cell (e.g., second cell 102e including a network entity and/or another apparatus 1000 of FIG. 10) (block 710). For example, the UE (e.g., using reception component 902, depicted in FIG. 9) may receive an indication to switch from a first TCI state associated with a first cell to a second TCI state associated with a second cell, as described herein.

As further shown in FIG. 7, in some aspects, process 700 may include applying the second TCI state, including switching from a first BWP associated with the first cell to a second BWP associated with the second cell (block 720). For example, the UE (e.g., using configuration component 908, depicted in FIG. 9) may apply the second TCI state and switch from a first BWP associated with the first cell to a second BWP associated with the second cell, as described herein.

Process 700 may include additional aspects, such as any single aspect or any combination of aspects described below and/or in connection with one or more other processes described elsewhere herein.

In a first aspect, the first cell is a serving cell, and the second cell is a non-serving cell.

In a second aspect, alone or in combination with the first aspect, the first cell is a non-serving cell, and the second cell is a different non-serving cell.

In a third aspect, alone or in combination with one or more of the first and second aspects, the first BWP is associated with RRC parameters for the first cell, and the second BWP is associated with RRC parameters for the second cell.

In a fourth aspect, alone or in combination with one or more of the first through third aspects, the RRC parameters for the first cell include a frequency raster, an SCS, a cell identifier associated with the first cell, or a combination thereof.

In a fifth aspect, alone or in combination with one or more of the first through fourth aspects, the RRC parameters for the second cell include a frequency raster, an SCS, a cell identifier associated with the second cell, or a combination thereof.

In a sixth aspect, alone or in combination with one or more of the first through fifth aspects, a plurality of BWPs, including the first BWP, are associated with the first cell.

In a seventh aspect, alone or in combination with one or more of the first through sixth aspects, a plurality of BWPs, including the second BWP, are associated with the second cell.

In an eighth aspect, alone or in combination with one or more of the first through seventh aspects, at least one BWP, of the first BWP and the second BWP, is associated with the first cell and with the second cell, and the at least one BWP is associated with RRC parameters common to the first cell and the second cell, is associated with cell-specific RRC parameters for the first cell, and is associated with cell-specific RRC parameters for the second cell.

In a ninth aspect, alone or in combination with one or more of the first through eighth aspects, the RRC parameters common to the first cell and the second cell include at least one of a frequency raster or an SCS, the cell-specific RRC parameters for the first cell include a cell identifier associated with the first cell, and the cell-specific RRC parameters for the second cell include a cell identifier associated with the second cell.

In a tenth aspect, alone or in combination with one or more of the first through ninth aspects, process 700 further includes receiving (e.g., using reception component 902) an indication that the first BWP is associated with the first cell and that the second BWP is associated with the second cell.

In an eleventh aspect, alone or in combination with one or more of the first through tenth aspects, process 700 further includes determining (e.g., using determination component 910, depicted in FIG. 9), based at least in part on one or more rules, that the first BWP is associated with the first cell and that the second BWP is associated with the second cell.

In a twelfth aspect, alone or in combination with one or more of the first through eleventh aspects, process 700 further includes receiving (e.g., using reception component 902) an indication to switch from the first BWP to the second BWP based at least in part on the indication to switch from the first TCI state to the second TCI state.

In a thirteenth aspect, alone or in combination with one or more of the first through twelfth aspects, process 700 further includes determining (e.g., using determination component 910) to switch from the first BWP to the second BWP based at least in part on the indication to switch from the first TCI state to the second TCI state.

In a fourteenth aspect, alone or in combination with one or more of the first through thirteenth aspects, the second TCI state is applied within an application time that is a maximum of a first application time associated with the second TCI state and a second application time associated with the second BWP.

In a fifteenth aspect, alone or in combination with one or more of the first through fourteenth aspects, the second TCI state is applied within an application time that is based at least in part on an SCS associated with the first BWP and an SCS associated with the second BWP, when the first cell and the second cell use a same CC.

In a sixteenth aspect, alone or in combination with one or more of the first through fifteenth aspects, the second TCI state is applied within an application time that is based at least in part on an SCS associated with a CC carrying the indication and an SCS associated with a CC for the second BWP, when the first cell and the second cell use different CCs.

In a seventeenth aspect, alone or in combination with one or more of the first through sixteenth aspects, process 700 further includes initiating a timer (e.g., using timer component 912, depicted in FIG. 9) associated with the second BWP based at least in part on applying the second TCI state.

In an eighteenth aspect, alone or in combination with one or more of the first through seventeenth aspects, process 700 further includes resetting the timer (e.g., using timer component 912) based at least in part on transmitting data or control information to the second cell or receiving data or control information from the second cell.

In a nineteenth aspect, alone or in combination with one or more of the first through eighteenth aspects, process 700 further includes applying (e.g., using configuration component 908) a default TCI state, including switching from the second BWP associated with the second cell to a default BWP, based at least in part on expiry of the timer associated with the second BWP.

In a twentieth aspect, alone or in combination with one or more of the first through nineteenth aspects, the default TCI state is the first TCI state, and the default BWP is the first BWP.

In a twenty-first aspect, alone or in combination with one or more of the first through twentieth aspects, the default TCI state is different from the first TCI state and the second TCI state, and the default BWP is different from the first BWP and the second BWP.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
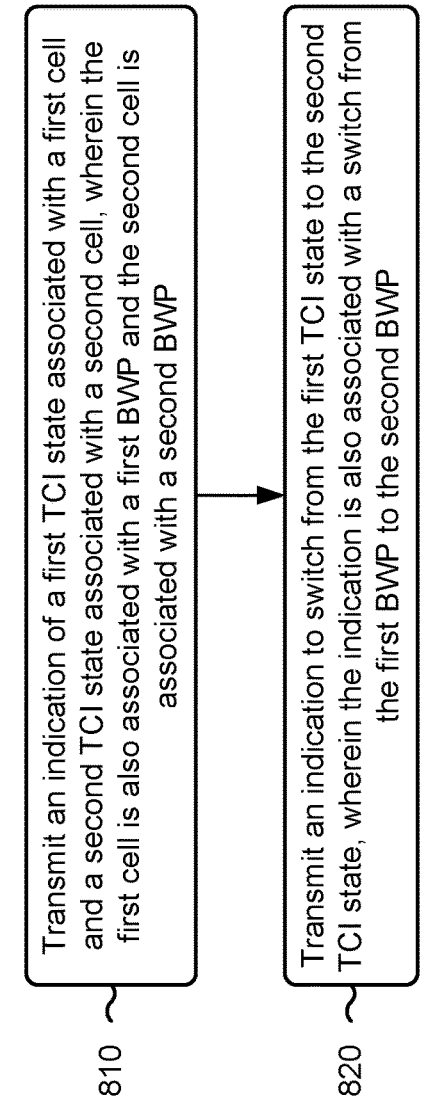

FIG. 8 is a diagram illustrating an example process 800 performed, for example, by a network entity, in accordance with the present disclosure. Example process 800 is an example where the network entity (e.g., an RU 340, a DU 330 or CU 310 instructing the RU 340, and/or apparatus 1000 of FIG. 10) performs operations associated with performing inter-cell mobility using BWP switching.

As shown in FIG. 8, in some aspects, process 800 may include transmitting an indication of a first TCI state associated with a first cell (e.g., first cell 102a) and a second TCI state associated with a second cell (e.g., second cell 102e) (block 810). For example, the base station (e.g., using transmission component 1004, depicted in FIG. 10) may transmit an indication of a first TCI state associated with a first cell and a second TCI state associated with a second cell, as described herein. In some aspects, the first cell is associated with a first BWP and the second cell is associated with a second BWP.

As further shown in FIG. 8, in some aspects, process 800 may include transmitting an indication to switch from the first TCI state to the second TCI state (block 820). For example, the base station (e.g., using transmission component 1004) may transmit an indication to switch from the first TCI state to the second TCI state, as described herein. In some aspects, the indication is associated with a switch from the first BWP to the second BWP.

Process 800 may include additional aspects, such as any single aspect or any combination of aspects described below and/or in connection with one or more other processes described elsewhere herein.

In a first aspect, the first cell is a serving cell, and the second cell is a non-serving cell.

In a second aspect, alone or in combination with the first aspect, the first cell is a non-serving cell, and the second cell is a different non-serving cell.

In a third aspect, alone or in combination with one or more of the first and second aspects, the first BWP is associated with RRC parameters for the first cell, and the second BWP is associated with RRC parameters for the second cell.

In a fourth aspect, alone or in combination with one or more of the first through third aspects, the RRC parameters for the first cell include a frequency raster, an SCS, a cell identifier associated with the first cell, or a combination thereof.

In a fifth aspect, alone or in combination with one or more of the first through fourth aspects, the RRC parameters for the second cell include a frequency raster, an SCS, a cell identifier associated with the second cell, or a combination thereof.

In a sixth aspect, alone or in combination with one or more of the first through fifth aspects, a plurality of BWPs, including the first BWP, are associated with the first cell.

In a seventh aspect, alone or in combination with one or more of the first through sixth aspects, a plurality of BWPs, including the second BWP, are associated with the second cell.

In an eighth aspect, alone or in combination with one or more of the first through seventh aspects, at least one BWP, of the first BWP and the second BWP, is associated with the first cell and with the second cell, and the at least one BWP is associated with RRC parameters common to the first cell and the second cell, is associated with cell-specific RRC parameters for the first cell, and is associated with cell-specific RRC parameters for the second cell.

In a ninth aspect, alone or in combination with one or more of the first through eighth aspects, the RRC parameters common to the first cell and the second cell include at least one of a frequency raster or an SCS, the cell-specific RRC parameters for the first cell include a cell identifier associated with the first cell, and the cell-specific RRC parameters for the second cell include a cell identifier associated with the second cell.

In a tenth aspect, alone or in combination with one or more of the first through ninth aspects, process 800 further includes transmitting (e.g., using transmission component 1004), to the UE, an indication that the first BWP is associated with the first cell and that the second BWP is associated with the second cell.

In an eleventh aspect, alone or in combination with one or more of the first through tenth aspects, process 800 further includes determining (e.g., using determination component 1008, depicted in FIG. 10), based at least in part on one or more rules stored in the memory, that the first BWP is associated with the first cell and that the second BWP is associated with the second cell.

In a twelfth aspect, alone or in combination with one or more of the first through eleventh aspects, process 800 further includes transmitting (e.g., using transmission component 1004), to the UE, an indication to switch from the first BWP to the second BWP based at least in part on determining that the second TCI state is associated with a reference signal from the second cell.

In a thirteenth aspect, alone or in combination with one or more of the first through twelfth aspects, process 800 further includes refraining from transmitting (e.g., using transmission component 1004) to the UE during an application time that is a maximum of a first application time associated with the second TCI state and a second application time associated with the second BWP.

In a fourteenth aspect, alone or in combination with one or more of the first through thirteenth aspects, process 800 includes refraining from transmitting (e.g., using transmission component 1004) to the UE during an application time that is based at least in part on an SCS associated with the first BWP and an SCS associated with the second BWP, when the first cell and the second cell use a same CC.

In a fifteenth aspect, alone or in combination with one or more of the first through fourteenth aspects, process 800 further includes refraining from transmitting (e.g., using transmission component 1004) to the UE during an application time that is based at least in part on an SCS associated with a CC carrying the indication and an SCS associated with a CC for the second BWP, when the first cell and the second cell use different CCs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a configuration component 908, a determination component 910, or a timer component 912, among other examples.

In some aspects, the apparatus 900 may be configured to perform one or more operations described herein in connection with FIG. 4-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

In some aspects, the reception component 902 may receive (e.g., from the apparatus 906) an indication to switch from a first TCI state associated with a first cell to a second TCI state associated with a second cell. Accordingly, the configuration component 908 may apply the second TCI state. In some aspects, the configuration component 908 may include one or more antennas, a modulator, a transmit MIMO processor, a transmit processor, a demodulator, a MIMO detector, a receive processor, a controller/processor, a memory, or a combination thereof, of the UE described above in connection with FIG. 2. The configuration component 908 may also switch from a first BWP associated with the first cell to a second BWP associated with the second cell.

In some aspects, the reception component 902 may receive an indication that the first BWP is associated with the first cell and that the second BWP is associated with the second cell. Additionally, or alternatively, the determination component 910 may determine, based at least in part on one or more rules, that the first BWP is associated with the first cell and that the second BWP is associated with the second cell. In some aspects, the determination component 910 may include a transmit MIMO processor, a transmit processor, a MIMO detector, a receive processor, a controller/processor, a memory, or a combination thereof, of the UE described above in connection with FIG. 2.

In some aspects, the reception component 902 may receive an indication to switch from the first BWP to the second BWP based at least in part on the indication to switch from the first TCI state to the second TCI state. As an alternative, the determination component 910 may determine to switch from the first BWP to the second BWP based at least in part on the indication to switch from the first TCI state to the second TCI state.

In some aspects, the timer component 912 may initiate a timer associated with the second BWP based at least in part on applying the second TCI state. In some aspects, the timer component 912 may include a transmit MIMO processor, a transmit processor, a MIMO detector, a receive processor, a controller/processor, a memory, or a combination thereof, of the UE described above in connection with FIG. 2. Accordingly, the configuration component 908 may apply a default TCI state based at least in part on the timer component 912 detecting expiry of the timer associated with the second BWP. The configuration component 908 may also switch from the second BWP associated with the second cell to a default BWP. In some aspects, the timer component 912 may reset the timer based at least in part on the transmission component 904 transmitting data or control information to the second cell and/or the reception component 902 receiving data or control information from the second cell.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

FIG. 10 is a block diagram of an example apparatus 1000 for wireless communication. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIG. 4-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

In some aspects, the transmission component 1004 may transmit (e.g., to the apparatus 1006) an indication of a first TCI state associated with a first cell and a second TCI state associated with a second cell. The first cell may also be associated with a first BWP, and the second cell may also be associated with a second BWP. Accordingly, the transmission component 1004 may transmit (e.g., to the apparatus 1006) an indication to switch from the first TCI state to the second TCI state. The indication may also be associated with a switch from the first BWP to the second BWP. For example, the transmission component 1004 may further transmit (e.g., to the apparatus 1006) an indication to switch from the first BWP to the second BWP based at least in part on the determination component 1008 determining that the second TCI state is associated with a reference signal from the second cell. In some aspects, the determination component 1008 may include a transmit MIMO processor, a transmit processor, a MIMO detector, a receive processor, a controller/processor, a memory, or a combination thereof, of the base station described above in connection with FIG. 2.

In some aspects, the transmission component 1004 may transmit (e.g., to the apparatus 1006) an indication that the first BWP is associated with the first cell and that the second BWP is associated with the second cell. Additionally, or alternatively, the determination component 1008 may determine, based at least in part on one or more rules, that the first BWP is associated with the first cell and that the second BWP is associated with the second cell.

In some aspects, the transmission component 1004 may refrain from transmitting (e.g., to the apparatus 1006) during an application time that is a maximum of a first application time associated with the second TCI state and a second application time associated with the second BWP. As an alternative, the transmission component 1004 may refrain from transmitting (e.g., to the apparatus 1006) during an application time that is based at least in part on an SCS associated with the first BWP and an SCS associated with the second BWP, when the first cell and the second cell use a same CC. As an alternative, the transmission component 1004 may refrain from transmitting (e.g., to the apparatus 1006) during an application time that is based at least in part on an SCS associated with a CC carrying the indication and an SCS associated with a CC for the second BWP, when the first cell and the second cell use different CCs.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving an indication to switch from a first transmission configuration indicator (TCI) state associated with a first cell to a second TCI state associated with a second cell; and applying the second TCI state, including switching from a first bandwidth part (BWP) associated with the first cell to a second BWP associated with the second cell.

Aspect 2: The method of Aspect 1, wherein the first cell is a serving cell, and the second cell is a non-serving cell.

Aspect 3: The method of Aspect 1, wherein the first cell is a non-serving cell, and the second cell is a different non-serving cell.

Aspect 4: The method of any one of Aspects 1 through 3, wherein the first BWP is associated with radio resource control (RRC) parameters for the first cell, and the second BWP is associated with RRC parameters for the second cell.

Aspect 5: The method of Aspect 4, wherein the RRC parameters for the first cell include a frequency raster, a subcarrier spacing, a cell identifier associated with the first cell, or a combination thereof.

Aspect 6: The method of any one of Aspects 4 through 5, wherein the RRC parameters for the second cell include a frequency raster, a subcarrier spacing, a cell identifier associated with the second cell, or a combination thereof.

Aspect 7: The method of any one of Aspects 1 through 6, wherein a plurality of BWPs, including the first BWP, are associated with the first cell.

Aspect 8: The method of any one of Aspects 1 through 7, wherein a plurality of BWPs, including the second BWP, are associated with the second cell.

Aspect 9: The method of any one of Aspects 1 through 8, wherein at least one BWP, of the first BWP and the second BWP, is associated with the first cell and with the second cell, and wherein the at least one BWP is associated with radio resource control (RRC) parameters common to the first cell and the second cell, is associated with cell-specific RRC parameters for the first cell, and is associated with cell-specific RRC parameters for the second cell.

Aspect 10: The method of Aspect 9, wherein the RRC parameters common to the first cell and the second cell include at least one of a frequency raster or a subcarrier spacing, the cell-specific RRC parameters for the first cell include a cell identifier associated with the first cell, and the cell-specific RRC parameters for the second cell include a cell identifier associated with the second cell.

Aspect 11: The method of any one of Aspects 1 through 10, further comprising: receiving an indication that the first BWP is associated with the first cell and that the second BWP is associated with the second cell.

Aspect 12: The method of any one of Aspects 1 through 11, further comprising: determining, based at least in part on one or more rules stored in the memory, that the first BWP is associated with the first cell and that the second BWP is associated with the second cell.

Aspect 13: The method of any one of Aspects 1 through 12, further comprising: receiving an indication to switch from the first BWP to the second BWP based at least in part on the indication to switch from the first TCI state to the second TCI state.

Aspect 14: The method of any one of Aspects 1 through 12, further comprising: determining to switch from the first BWP to the second BWP based at least in part on the indication to switch from the first TCI state to the second TCI state.

Aspect 15: The method of any one of Aspects 1 through 14, wherein the second TCI state is applied within an application time that is a maximum of a first application time associated with the second TCI state and a second application time associated with the second BWP.

Aspect 16: The method of any one of Aspects 1 through 14, wherein the second TCI state is applied within an application time that is based at least in part on a sub carrier spacing (SCS) associated with the first BWP and an SCS associated with the second BWP, when the first cell and the second cell use a same component carrier.

Aspect 17: The method of any one of Aspects 1 through 14, wherein the second TCI state is applied within an application time that is based at least in part on a subcarrier spacing (SCS) associated with a component carrier carrying the indication and an SCS associated with a component carrier for the second BWP, when the first cell and the second cell use different component carriers.

Aspect 18: The method of any one of Aspects 1 through 17, further comprising: initiating a timer associated with the second BWP based at least in part on applying the second TCI state.

Aspect 19: The method of Aspect 18, further comprising: resetting the timer based at least in part on transmitting data or control information to the second cell or receiving data or control information from the second cell.

Aspect 20: The method of any one of Aspects 18 through 19, further comprising: applying a default TCI state, including switching from the second BWP associated with the second cell to a default BWP, based at least in part on expiry of the timer associated with the second BWP.

Aspect 21: The method of Aspect 20, wherein the default TCI state is the first TCI state, and the default BWP is the first BWP.

Aspect 22: The method of Aspect 20, wherein the default TCI state is different from the first TCI state and the second TCI state, and the default BWP is different from the first BWP and the second BWP.

Aspect 23: A method of wireless communication performed by a base station, comprising: transmitting, to a user equipment (UE), an indication of a first transmission configuration indicator (TCI) state associated with a first cell and a second TCI state associated with a second cell, wherein the first cell is associated with a first bandwidth part (BWP) and the second cell is associated with a second BWP; and transmitting, to the UE, an indication to switch from the first TCI state to the second TCI state, wherein the indication is associated with a switch from the first BWP to the second BWP.

Aspect 24: The method of Aspect 23, wherein the first cell is a serving cell, and the second cell is a non-serving cell.

Aspect 25: The method of Aspect 23, wherein the first cell is a non-serving cell, and the second cell is a different non-serving cell.

Aspect 26: The method of any one of Aspects 23 through 25, wherein the first BWP is associated with radio resource control (RRC) parameters for the first cell, and the second BWP is associated with RRC parameters for the second cell.

Aspect 27: The method of Aspect 26, wherein the RRC parameters for the first cell include a frequency raster, a subcarrier spacing, a cell identifier associated with the first cell, or a combination thereof.

Aspect 28: The method of any one of Aspects 26 through 27, wherein the RRC parameters for the second cell include a frequency raster, a subcarrier spacing, a cell identifier associated with the second cell, or a combination thereof.

Aspect 29: The method of any one of Aspects 23 through 28, wherein a plurality of BWPs, including the first BWP, are associated with the first cell.

Aspect 30: The method of any one of Aspects 23 through 29, wherein a plurality of BWPs, including the second BWP, are associated with the second cell.

Aspect 31: The method of any one of Aspects 23 through 30, wherein at least one BWP, of the first BWP and the second BWP, is associated with the first cell and with the second cell, and wherein the at least one BWP is associated with radio resource control (RRC) parameters common to the first cell and the second cell, is associated with cell-specific RRC parameters for the first cell, and is associated with cell-specific RRC parameters for the second cell.

Aspect 32: The method of Aspect 31, wherein the RRC parameters common to the first cell and the second cell include at least one of a frequency raster or a subcarrier spacing, the cell-specific RRC parameters for the first cell include a cell identifier associated with the first cell, and the cell-specific RRC parameters for the second cell include a cell identifier associated with the second cell.

Aspect 33: The method of any one of Aspects 23 through 32, further comprising: transmitting, to the UE, an indication that the first BWP is associated with the first cell and that the second BWP is associated with the second cell.

Aspect 34: The method of any one of Aspects 23 through 33, further comprising: determining, based at least in part on one or more rules stored in the memory, that the first BWP is associated with the first cell and that the second BWP is associated with the second cell.

Aspect 35: The method of any one of Aspects 23 through 34, further comprising: transmitting, to the UE, an indication to switch from the first BWP to the second BWP based at least in part on determining that the second TCI state is associated with a reference signal from the second cell.

Aspect 36: The method of any one of Aspects 23 through 35, further comprising: refraining from transmitting to the UE during an application time that is a maximum of a first application time associated with the second TCI state and a second application time associated with the second BWP.

Aspect 37: The method of any one of Aspects 23 through 35, further comprising: refraining from transmitting to the UE during an application time that is based at least in part on a subcarrier spacing (SCS) associated with the first BWP and an SCS associated with the second BWP, when the first cell and the second cell use a same component carrier.

Aspect 38: The method of any one of Aspects 23 through 35, further comprising: refraining from transmitting to the UE during an application time that is based at least in part on a subcarrier spacing (SCS) associated with a component carrier carrying the indication and an SCS associated with a component carrier for the second BWP, when the first cell and the second cell use different component carriers.

Aspect 39: An apparatus for wireless communication at a device, comprising a processor; memory coupled with the processor; and instructions stored in the memory and executable by the processor to cause the apparatus to perform the method of one or more of Aspects 1-22.

Aspect 40: A device for wireless communication, comprising a memory and one or more processors coupled to the memory, the one or more processors configured to perform the method of one or more of Aspects 1-22.

Aspect 41: An apparatus for wireless communication, comprising at least one means for performing the method of one or more of Aspects 1-22.

Aspect 42: A non-transitory computer-readable medium storing code for wireless communication, the code comprising instructions executable by a processor to perform the method of one or more of Aspects 1-22.

Aspect 43: A non-transitory computer-readable medium storing a set of instructions for wireless communication, the set of instructions comprising one or more instructions that, when executed by one or more processors of a device, cause the device to perform the method of one or more of Aspects 1-22.

Aspect 44: An apparatus for wireless communication at a device, comprising a processor; memory coupled with the processor; and instructions stored in the memory and executable by the processor to cause the apparatus to perform the method of one or more of Aspects 23-38.

Aspect 45: A device for wireless communication, comprising a memory and one or more processors coupled to the memory, the one or more processors configured to perform the method of one or more of Aspects 23-38.

Aspect 46: An apparatus for wireless communication, comprising at least one means for performing the method of one or more of Aspects 23-38.

Aspect 47: A non-transitory computer-readable medium storing code for wireless communication, the code comprising instructions executable by a processor to perform the method of one or more of Aspects 23-38.

Aspect 48: A non-transitory computer-readable medium storing a set of instructions for wireless communication, the set of instructions comprising one or more instructions that, when executed by one or more processors of a device, cause the device to perform the method of one or more of Aspects 23-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive an indication to switch from a first transmission configuration indicator (TCI) state associated with a first cell to a second TCI state associated with a second cell; and
      apply the second TCI state, including switching, based at least in part on the second TCI state, from a first bandwidth part (BWP) associated with the first cell to a second BWP associated with the second cell.

2. The apparatus of claim 1, wherein the first cell is a serving cell, and the second cell is a non-serving cell.

3. The apparatus of claim 1, wherein the first cell is a non-serving cell, and the second cell is a different non-serving cell.

4. The apparatus of claim 1, wherein the first BWP is associated with radio resource control (RRC) parameters for the first cell, and the second BWP is associated with RRC parameters for the second cell.

5. The apparatus of claim 4, wherein the RRC parameters for the first cell include a frequency raster, a subcarrier spacing, a cell identifier associated with the first cell, or a combination thereof.

6. The apparatus of claim 4, wherein the RRC parameters for the second cell include a frequency raster, a subcarrier spacing, a cell identifier associated with the second cell, or a combination thereof.

7. The apparatus of claim 1, wherein a plurality of BWPs, including the first BWP, are associated with the first cell.

8. The apparatus of claim 1, wherein a plurality of BWPs, including the second BWP, are associated with the second cell.

9. The apparatus of claim 1, wherein at least one BWP, of the first BWP and the second BWP, is associated with the first cell and with the second cell, and wherein the at least one BWP is associated with radio resource control (RRC) parameters common to the first cell and the second cell, is associated with cell-specific RRC parameters for the first cell, and is associated with cell-specific RRC parameters for the second cell.

10. The apparatus of claim 9, wherein the RRC parameters common to the first cell and the second cell include at least one of a frequency raster or a subcarrier spacing, the cell-specific RRC parameters for the first cell include a cell identifier associated with the first cell, and the cell-specific RRC parameters for the second cell include a cell identifier associated with the second cell.

11. The apparatus of claim 1, wherein the one or more processors are further configured to:
receive an indication that the first BWP is associated with the first cell and that the second BWP is associated with the second cell.

12. The apparatus of claim 1, wherein the one or more processors are further configured to:
determine, based at least in part on one or more rules stored in the one or more memories, that the first BWP is associated with the first cell and that the second BWP is associated with the second cell.

13. The apparatus of claim 1, wherein the one or more processors are further configured to:
receive an indication to switch from the first BWP to the second BWP based at least in part on the indication to switch from the first TCI state to the second TCI state.

14. The apparatus of claim 1, wherein the one or more processors are further configured to:
determine to switch from the first BWP to the second BWP based at least in part on the indication to switch from the first TCI state to the second TCI state.

15. The apparatus of claim 1, wherein the second TCI state is applied within an application time that is a maximum of a first application time associated with the second TCI state and a second application time associated with the second BWP.

16. The apparatus of claim 1, wherein the second TCI state is applied within an application time that is based at least in part on a subcarrier spacing (SCS) associated with the first BWP and an SCS associated with the second BWP, when the first cell and the second cell use a same component carrier.

17. The apparatus of claim 1, wherein the second TCI state is applied within an application time that is based at least in part on a subcarrier spacing (SCS) associated with a component carrier carrying the indication and an SCS associated with a component carrier for the second BWP, when the first cell and the second cell use different component carriers.

18. The apparatus of claim 1, wherein the one or more processors are further configured to:
initiate a timer associated with the second BWP based at least in part on applying the second TCI state.

19. The apparatus of claim 18, wherein the one or more processors are further configured to:
reset the timer based at least in part on transmitting data or control information to the second cell or receiving data or control information from the second cell.

20. The apparatus of claim 18, wherein the one or more processors are further configured to:
apply a default TCI state, including switching from the second BWP associated with the second cell to a default BWP, based at least in part on expiry of the timer associated with the second BWP.

21. The apparatus of claim 20, wherein the default TCI state is the first TCI state, and the default BWP is the first BWP.

22. The apparatus of claim 20, wherein the default TCI state is different from the first TCI state and the second TCI state, and the default BWP is different from the first BWP and the second BWP.

23. An apparatus for wireless communication at a network entity, comprising:
one or more memories; and
one or more processors, coupled to the one or more memories, configured to:
transmit an indication of a first transmission configuration indicator (TCI) state associated with a first cell and a second TCI state associated with a second cell, wherein the first cell is associated with a first bandwidth part (BWP) and the second cell is associated with a second BWP; and
transmit an indication to switch from the first TCI state to the second TCI state, wherein the indication is associated with a switch, based at least in part on the second TCI state, from the first BWP to the second BWP.

24. The apparatus of claim 23, wherein the first BWP is associated with radio resource control (RRC) parameters for the first cell, and the second BWP is associated with RRC parameters for the second cell.

25. The apparatus of claim 23, wherein at least one BWP, of the first BWP and the second BWP, is associated with the first cell and with the second cell, and wherein the at least one BWP is associated with radio resource control (RRC) parameters common to the first cell and the second cell, is associated with cell-specific RRC parameters for the first cell, and is associated with cell-specific RRC parameters for the second cell.

26. The apparatus of claim 23, wherein the one or more processors are further configured to:
transmit an indication that the first BWP is associated with the first cell and that the second BWP is associated with the second cell.

27. The apparatus of claim 23, wherein the one or more processors are further configured to:
determine, based at least in part on one or more rules stored in the one or more memories, that the first BWP is associated with the first cell and that the second BWP is associated with the second cell.

28. The apparatus of claim 23, wherein the one or more processors are further configured to:
transmit an indication to switch from the first BWP to the second BWP based at least in part on determining that the second TCI state is associated with a reference signal from the second cell.

29. A method of wireless communication performed by a user equipment (UE), comprising:

receiving an indication to switch from a first transmission configuration indicator (TCI) state associated with a first cell to a second TCI state associated with a second cell; and applying the second TCI state, including switching, based at least in part on the second TCI state, from a first bandwidth part (BWP) associated with the first cell to a second BWP associated with the second cell.

30. A method of wireless communication performed by a network entity, comprising:

transmitting an indication of a first transmission configuration indicator (TCI) state associated with a first cell and a second TCI state associated with a second cell, wherein the first cell is associated with a first bandwidth part (BWP) and the second cell is associated with a second BWP; and transmitting an indication to switch, based at least in part on the second TCI state, from the first TCI state to the second TCI state, wherein the indication is associated with a switch from the first BWP to the second BWP.

* * * * *